(12) United States Patent
Humbert

(10) Patent No.: US 8,303,043 B2
(45) Date of Patent: Nov. 6, 2012

(54) TENSIONING APPARATUSES FOR OCCUPANT RESTRAINT SYSTEMS AND ASSOCIATED SYSTEMS AND METHODS

(75) Inventor: Todd Humbert, Chandler, AZ (US)

(73) Assignee: AmSafe, Inc. (Phoenix Group), Phoenix, AZ (US)

( * ) Notice: Subject to any disclaimer, the term of this patent is extended or adjusted under 35 U.S.C. 154(b) by 184 days.

(21) Appl. No.: 12/569,522

(22) Filed: Sep. 29, 2009

(65) Prior Publication Data

US 2010/0213753 A1    Aug. 26, 2010

Related U.S. Application Data

(60) Provisional application No. 61/101,085, filed on Sep. 29, 2008.

(51) Int. Cl.
*B60R 21/00* (2006.01)
(52) U.S. Cl. .......................................................... 297/477
(58) Field of Classification Search .................. 297/477, 297/216.1, 479; 280/807
See application file for complete search history.

(56) References Cited

U.S. PATENT DOCUMENTS

| | | |
|---|---|---|
| 906,045 A | 12/1908 | Martin |
| 1,079,080 A | 11/1913 | Ward |
| 1,438,898 A | 12/1922 | Carpmill |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,710,999 A | 6/1955 | Davis |
| 2,763,451 A | 9/1956 | Moran |
| 2,803,864 A | 8/1957 | Bishaf |
| 2,846,745 A | 8/1958 | Lathrop |
| 2,869,200 A | 1/1959 | Phillips et al. |
| 2,876,516 A | 3/1959 | Cummings |
| 2,893,088 A | 7/1959 | Harper et al. |
| 2,901,794 A | 9/1959 | Prete, Jr. |
| 2,938,254 A | 5/1960 | Gaylord |

(Continued)

FOREIGN PATENT DOCUMENTS

CA    2038505 A1    9/1991

(Continued)

OTHER PUBLICATIONS

Schroth Safety Products, Installation Instructions, HMMWV Gunner restraint, Single Lower with Swivel—M1151, Revision: A, Jul. 28, 2006, pp. 1-10.

(Continued)

*Primary Examiner* — Milton Nelson, Jr.
(74) *Attorney, Agent, or Firm* — Perkins Coie LLP

(57) ABSTRACT

Tensioning apparatuses for occupant restraint systems and associated systems and methods. In one embodiment, an occupant restraint system for a vehicle can include a flexible web configured to extend across at least a portion of an occupant seated in the vehicle and an electrically actuated web retractor operably coupled to a proximal end portion of the web. The web retractor is configured to automatically wind and unwind the web. The system also includes an acceleration sensor operably coupled to the electrically actuated web retractor. The acceleration sensor is configured to send an electrical signal to the web retractor in response to a vehicle acceleration above a preset magnitude. In response to the signal, the web retractor is configured to (a) retract the web, and/or (b) at least temporarily prevent the web from moving inwardly or outwardly.

13 Claims, 8 Drawing Sheets

U.S. PATENT DOCUMENTS

| | | |
|---|---|---|
| 3,029,487 A | 4/1962 | Asai |
| 3,118,208 A | 1/1964 | Wexler |
| 3,179,992 A | 4/1965 | Murphy, Sr. |
| 3,218,685 A | 11/1965 | Atumi |
| 3,226,791 A | 1/1966 | Carter |
| 3,256,576 A | 6/1966 | Klove, Jr. et al. |
| 3,262,169 A | 7/1966 | Jantzen |
| 3,289,261 A | 12/1966 | Davis |
| 3,312,502 A | 4/1967 | Coe |
| 3,369,842 A | 2/1968 | Adams et al. |
| 3,414,947 A | 12/1968 | Holmberg et al. |
| 3,451,720 A | 6/1969 | Makinen |
| 3,491,414 A | 1/1970 | Stoffel |
| 3,505,711 A | 4/1970 | Carter |
| 3,523,342 A | 8/1970 | Spires |
| 3,564,672 A | 2/1971 | McIntyre |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,673,645 A | 7/1972 | Burleigh et al. |
| 3,678,542 A | 7/1972 | Prete, Jr. |
| 3,714,684 A | 2/1973 | Gley |
| 3,760,464 A | 9/1973 | Higuchi |
| 3,825,979 A | 7/1974 | Jakob |
| 3,879,810 A | 4/1975 | Prete, Jr. et al. |
| 3,935,618 A | 2/1976 | Fohl et al. |
| 3,986,234 A | 10/1976 | Frost et al. |
| 4,051,743 A | 10/1977 | Gaylord |
| D248,618 S | 7/1978 | Anthony |
| 4,100,657 A | 7/1978 | Minolla et al. |
| 4,118,833 A | 10/1978 | Knox et al. |
| 4,128,924 A | 12/1978 | Happel et al. |
| 4,148,224 A | 4/1979 | Craig |
| 4,181,832 A | 1/1980 | Ueda et al. |
| 4,184,234 A | 1/1980 | Anthony et al. |
| 4,196,500 A | 4/1980 | Happel et al. |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike et al. |
| 4,317,263 A | 3/1982 | Fohl et al. |
| 4,321,734 A | 3/1982 | Gandelman |
| 4,334,341 A | 6/1982 | Krautz et al. |
| 4,336,636 A | 6/1982 | Ishiguro et al. |
| 4,366,604 A | 1/1983 | Anthony et al. |
| 4,408,374 A | 10/1983 | Fohl et al. |
| 4,419,874 A | 12/1983 | Brentini et al. |
| 4,425,688 A | 1/1984 | Anthony et al. |
| 4,457,052 A | 7/1984 | Hauber |
| 4,525,901 A | 7/1985 | Krauss |
| 4,545,097 A | 10/1985 | Wier et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson et al. |
| 4,644,618 A | 2/1987 | Holmberg et al. |
| 4,646,400 A | 3/1987 | Tanaka et al. |
| 4,648,483 A | 3/1987 | Skyba |
| 4,651,946 A | 3/1987 | Anthony et al. |
| 4,660,889 A | 4/1987 | Anthony et al. |
| 4,679,852 A | 7/1987 | Anthony et al. |
| 4,682,791 A | 7/1987 | Ernst et al. |
| 4,685,176 A | 8/1987 | Burnside et al. |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm et al. |
| D296,678 S | 7/1988 | Lortz et al. |
| 4,757,579 A | 7/1988 | Nishino et al. |
| 4,790,597 A | 12/1988 | Bauer et al. |
| 4,809,409 A | 3/1989 | Van Riesen et al. |
| 4,832,410 A | 5/1989 | Bougher |
| 4,843,688 A | 7/1989 | Ikeda et al. |
| 4,854,608 A | 8/1989 | Barral et al. |
| D303,232 S | 9/1989 | Lortz et al. |
| 4,876,770 A | 10/1989 | Bougher |
| 4,876,772 A | 10/1989 | Anthony et al. |
| 4,911,377 A | 3/1990 | Lortz et al. |
| 4,919,484 A | 4/1990 | Bougher et al. |
| 4,934,030 A | 6/1990 | Spinosa et al. |
| 4,940,254 A | 7/1990 | Ueno et al. |
| 4,942,649 A | 7/1990 | Anthony et al. |
| 4,995,640 A | 2/1991 | Saito et al. |
| 5,015,010 A | 5/1991 | Homeier et al. |
| 5,023,981 A | 6/1991 | Anthony et al. |
| 5,031,962 A | 7/1991 | Lee |
| 5,038,446 A | 8/1991 | Anthony et al. |
| 5,039,169 A | 8/1991 | Bougher et al. |
| 5,067,212 A | 11/1991 | Ellis |
| 5,074,011 A | 12/1991 | Carlson |
| 5,084,946 A | 2/1992 | Lee |
| 5,088,160 A | 2/1992 | Warrick |
| 5,088,163 A | 2/1992 | van Riesen et al. |
| 5,119,532 A | 6/1992 | Tanaka et al. |
| 5,142,748 A | 9/1992 | Anthony et al. |
| 5,159,732 A | 11/1992 | Burke et al. |
| 5,160,186 A | 11/1992 | Lee |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth et al. |
| D342,465 S | 12/1993 | Anthony et al. |
| 5,267,377 A | 12/1993 | Gillis et al. |
| 5,269,051 A | 12/1993 | McFalls |
| 5,282,672 A | 2/1994 | Borlinghaus |
| 5,282,706 A | 2/1994 | Anthony et al. |
| 5,283,933 A | 2/1994 | Wiseman et al. |
| 5,286,090 A | 2/1994 | Templin et al. |
| 5,292,181 A | 3/1994 | Dybro |
| 5,308,148 A | 5/1994 | Peterson et al. |
| 5,311,653 A | 5/1994 | Merrick |
| 5,369,855 A | 12/1994 | Tokugawa et al. |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,406,681 A | 4/1995 | Olson et al. |
| D359,710 S | 6/1995 | Chinni et al. |
| 5,432,987 A | 7/1995 | Schroth |
| 5,443,302 A | 8/1995 | Dybro |
| 5,451,094 A | 9/1995 | Templin et al. |
| D364,124 S | 11/1995 | Lortz et al. |
| 5,471,714 A | 12/1995 | Olson et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,560,565 A | 10/1996 | Merrick et al. |
| 5,561,891 A | 10/1996 | Hsieh et al. |
| 5,568,676 A | 10/1996 | Freeman |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,743,597 A | 4/1998 | Jessup et al. |
| 5,774,947 A | 7/1998 | Anscher |
| 5,779,319 A | 7/1998 | Merrick |
| D397,063 S | 8/1998 | Woellert et al. |
| 5,794,878 A | 8/1998 | Carpenter et al. |

| | | |
|---|---|---|
| 5,813,097 A | 9/1998 | Woellert et al. |
| 5,839,793 A | 11/1998 | Merrick et al. |
| 5,873,635 A | 2/1999 | Merrick |
| 5,882,084 A * | 3/1999 | Verellen et al. ............... 297/478 |
| D407,667 S | 4/1999 | Homeier |
| 5,908,223 A | 6/1999 | Miller |
| 5,915,630 A | 6/1999 | Step |
| 5,928,300 A * | 7/1999 | Rogers et al. ................... 701/45 |
| 5,934,760 A | 8/1999 | Schroth et al. |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,056,320 A | 5/2000 | Khalifa et al. |
| 6,065,367 A | 5/2000 | Schroth et al. |
| 6,065,777 A | 5/2000 | Merrick |
| 6,123,388 A | 9/2000 | Vits et al. |
| RE37,123 E | 4/2001 | Templin et al. |
| 6,230,370 B1 | 5/2001 | Nelsen |
| 6,260,884 B1 | 7/2001 | Bittner et al. |
| 6,295,700 B1 | 10/2001 | Plzak |
| 6,309,024 B1 | 10/2001 | Busch |
| 6,312,015 B1 | 11/2001 | Merrick et al. |
| 6,315,232 B1 | 11/2001 | Merrick |
| 6,322,140 B1 | 11/2001 | Jessup et al. |
| 6,328,379 B1 | 12/2001 | Merrick et al. |
| 6,363,591 B1 | 4/2002 | Bell et al. |
| 6,400,145 B1 | 6/2002 | Chamings et al. |
| 6,412,863 B1 | 7/2002 | Merrick et al. |
| 6,418,596 B2 | 7/2002 | Haas et al. |
| 6,425,632 B1 | 7/2002 | Anthony et al. |
| 6,442,807 B1 | 9/2002 | Adkisson |
| 6,446,272 B1 | 9/2002 | Lee et al. |
| 6,463,638 B1 | 10/2002 | Pontaoe |
| 6,467,849 B1 | 10/2002 | Deptolla et al. |
| 6,485,098 B1 | 11/2002 | Vits et al. |
| 6,508,515 B2 | 1/2003 | Vits et al. |
| 6,513,208 B1 | 2/2003 | Sack et al. |
| 6,543,101 B2 | 4/2003 | Sack et al. |
| 6,547,273 B2 | 4/2003 | Grace et al. |
| 6,560,825 B2 | 5/2003 | Maciejczyk et al. |
| 6,566,869 B2 | 5/2003 | Chamings et al. |
| 6,588,077 B2 | 7/2003 | Katsuyama et al. |
| 6,619,753 B2 | 9/2003 | Takayama |
| 6,631,926 B2 | 10/2003 | Merrick et al. |
| 6,665,912 B2 | 12/2003 | Turner et al. |
| 6,694,577 B2 | 2/2004 | Di Perrero et al. |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,786,294 B2 | 9/2004 | Specht et al. |
| 6,786,510 B2 | 9/2004 | Roychoudhury et al. |
| 6,786,511 B2 | 9/2004 | Heckmayr et al. |
| 6,796,007 B1 | 9/2004 | Anscher |
| 6,802,470 B2 | 10/2004 | Smithson et al. |
| 6,820,310 B2 | 11/2004 | Woodard et al. |
| 6,834,822 B2 | 12/2004 | Koning et al. |
| 6,836,754 B2 | 12/2004 | Cooper |
| 6,840,544 B2 | 1/2005 | Prentkowski |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kempf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,935,701 B1 | 8/2005 | Arnold et al. |
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,479 B2 | 2/2006 | Desmarais et al. |
| 7,010,836 B2 | 3/2006 | Acton et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,077,475 B2 | 7/2006 | Boyle |
| 7,080,856 B2 | 7/2006 | Desmarais et al. |
| 7,100,991 B2 | 9/2006 | Schroth et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 * | 11/2006 | Hishon et al. .............. 242/390.8 |
| 7,144,085 B2 | 12/2006 | Vits et al. |
| 7,147,251 B2 | 12/2006 | Bell et al. |
| 7,159,285 B2 | 1/2007 | Karlsson et al. |
| 7,180,258 B2 | 2/2007 | Specht et al. |
| 7,182,370 B2 | 2/2007 | Arnold |
| 7,210,707 B2 | 5/2007 | Schroth et al. |
| 7,219,929 B2 | 5/2007 | Bell et al. |
| 7,232,154 B2 | 6/2007 | Desmarais et al. |
| 7,237,741 B2 | 7/2007 | Specht et al. |
| 7,240,924 B2 | 7/2007 | Kohlndorfer et al. |
| 7,246,854 B2 | 7/2007 | Dingman et al. |
| 7,263,750 B2 | 9/2007 | Keene et al. |
| 7,278,684 B2 | 10/2007 | Boyle |
| D555,358 S | 11/2007 | King |
| 7,300,013 B2 | 11/2007 | Morgan et al. |
| 7,341,216 B2 | 3/2008 | Heckmayr et al. |
| 7,367,590 B2 | 5/2008 | Koning et al. |
| 7,377,464 B2 | 5/2008 | Morgan |
| 7,384,014 B2 | 6/2008 | Ver Hoven et al. |
| 7,395,585 B2 | 7/2008 | Longley et al. |
| 7,404,239 B1 | 7/2008 | Walton et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,481,399 B2 | 1/2009 | Nohren et al. |
| 7,516,808 B2 * | 4/2009 | Tanaka ......................... 180/268 |
| 7,520,036 B1 | 4/2009 | Baldwin et al. |
| 7,533,902 B2 | 5/2009 | Arnold et al. |
| 7,547,043 B2 * | 6/2009 | Kokeguchi et al. ........... 280/735 |
| 7,631,830 B2 | 12/2009 | Boelstler et al. |
| 7,669,794 B2 | 3/2010 | Boelstler et al. |
| 8,096,027 B2 | 1/2012 | Chin et al. |
| 2002/0135175 A1 | 9/2002 | Schroth |
| 2005/0127660 A1 | 6/2005 | Liu |
| 2005/0284977 A1 | 12/2005 | Specht et al. |
| 2006/0075609 A1 | 4/2006 | Dingman et al. |
| 2006/0097096 A1 * | 5/2006 | Heckmayr ..................... 242/374 |
| 2006/0237573 A1 | 10/2006 | Boelstler et al. |
| 2007/0241549 A1 | 10/2007 | Boelstler et al. |
| 2007/0257480 A1 | 11/2007 | Van Druff et al. |
| 2008/0100051 A1 | 5/2008 | Bell et al. |
| 2008/0100122 A1 | 5/2008 | Bell et al. |
| 2008/0172847 A1 | 7/2008 | Keene et al. |
| 2009/0241305 A1 | 10/2009 | Buckingham |
| 2010/0115737 A1 | 5/2010 | Foubert |
| 2010/0125983 A1 | 5/2010 | Keene et al. |

FOREIGN PATENT DOCUMENTS

| | | |
|---|---|---|
| CA | 2091526 | 10/1993 |
| CA | 2112960 | 12/2002 |
| CA | 2450744 | 1/2008 |
| DE | 4421688 | 12/1995 |
| DE | 69019765 | 2/1996 |

| | | |
|---|---|---|
| EP | 0363062 | 4/1990 |
| EP | 0380442 | 8/1990 |
| EP | 0401455 | 12/1990 |
| EP | 0404730 | 12/1990 |
| EP | 0449772 | 10/1991 |
| EP | 0519296 | 12/1992 |
| EP | 0561274 | 9/1993 |
| EP | 0608564 | 8/1994 |
| EP | 1153789 | 11/2001 |
| EP | 1447021 | 8/2004 |
| GB | 1047761 | 11/1966 |
| GB | 2055952 A | 3/1981 |
| JP | 10119611 A | 5/1998 |
| JP | 2001138858 A * | 5/2001 |
| WO | WO-8603386 | 6/1986 |
| WO | WO-03009717 A2 | 2/2003 |
| WO | WO-2004004507 | 1/2004 |
| WO | WO-2006041859 | 4/2006 |
| WO | WO-2010/027853 | 3/2010 |

OTHER PUBLICATIONS

Global Seating Systems LLC, "CCOPS," Cobra: Soldier Survival System, 1 page, undated.

International Search Report and Written Opinion, PCT Application No. PCT/US2006/22367; Applicant: AmSafe, Inc.; Date of Mailing: Sep. 18, 2006, 6 pages.

International Search Report and Written Opinion; PCT Application No. PCT/US2009/31613; Applicant: AmSafe Commercial Products, Inc.; Date of Mailing: Mar. 3, 2009, 11 pages.

Toltzman, Randall and Shaul, Rich; "Buckle Assembly"; U.S. Appl. No. 29/297,210, filed Nov. 6, 2007.

* cited by examiner

TENSIONING APPARATUSES FOR OCCUPANT RESTRAINT SYSTEMS AND ASSOCIATED SYSTEMS AND METHODS

CROSS REFERENCE TO APPLICATIONS INCORPORATED HEREIN BY REFERENCE

This application claims the benefit of U.S. Provisional Patent Application No. 61/101,085, filed Sep. 29, 2008, which is incorporated herein by reference in its entirety.

This application is also related to U.S. Provisional Patent Application No. 61/029,292 entitled PERSONAL RESTRAINT SYSTEMS AND ASSOCIATED TENSIONING APPARATUSES, filed Feb. 15, 2008, and incorporated herein by reference in its entirety.

TECHNICAL FIELD

The following disclosure relates generally to tensioning apparatuses for occupant restraint systems and associated systems and methods.

BACKGROUND

Conventional occupant restraint systems, such as those used in passenger vehicles, typically include one or more webs or belts to restrain passengers in their seats. One type of restraint system, for example, includes a shoulder web and a lap web. Other restraint systems have more than two webs (e.g., two shoulder webs, a lap web, and a crotch web) to more adequately restrain passengers during impacts that can cause dislocation of the passengers in the vertical direction.

DETAILED DESCRIPTION

The present disclosure describes tensioning apparatuses for occupant restraint systems and associated systems and methods. Many specific details are set forth in the following description and in FIGS. 1A-4C to provide a thorough understanding of various embodiments of the disclosure. Other details describing well-known structures and systems often associated with restraint systems and related vehicle structures, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

Figure 1A:
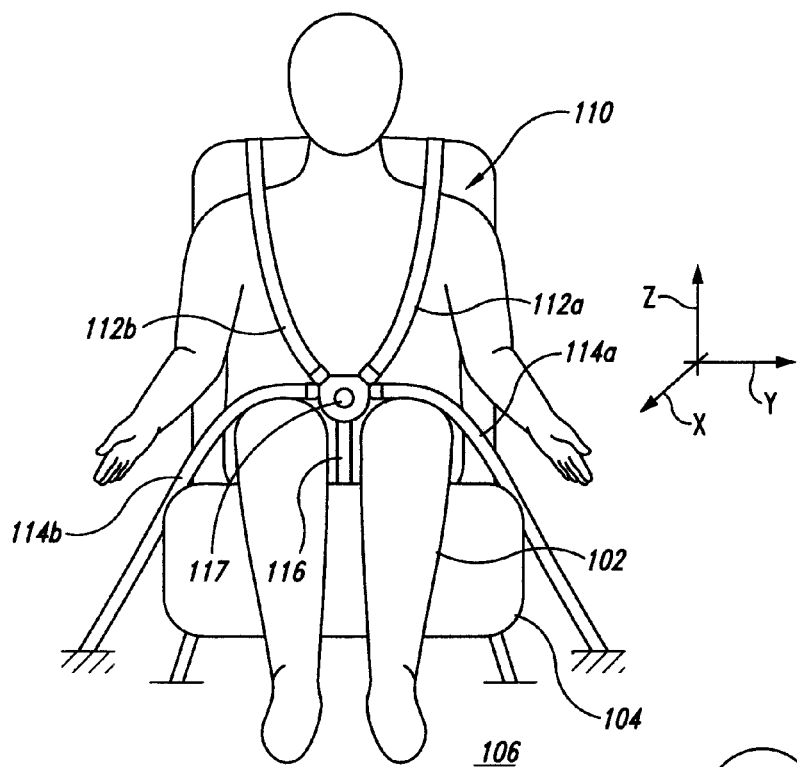
FIGS. 1A and 1B are partially schematic front and back views, respectively, of an occupant restraint system having a web tensioning subsystem configured in accordance with an embodiment of the disclosure.
Figure 1B:
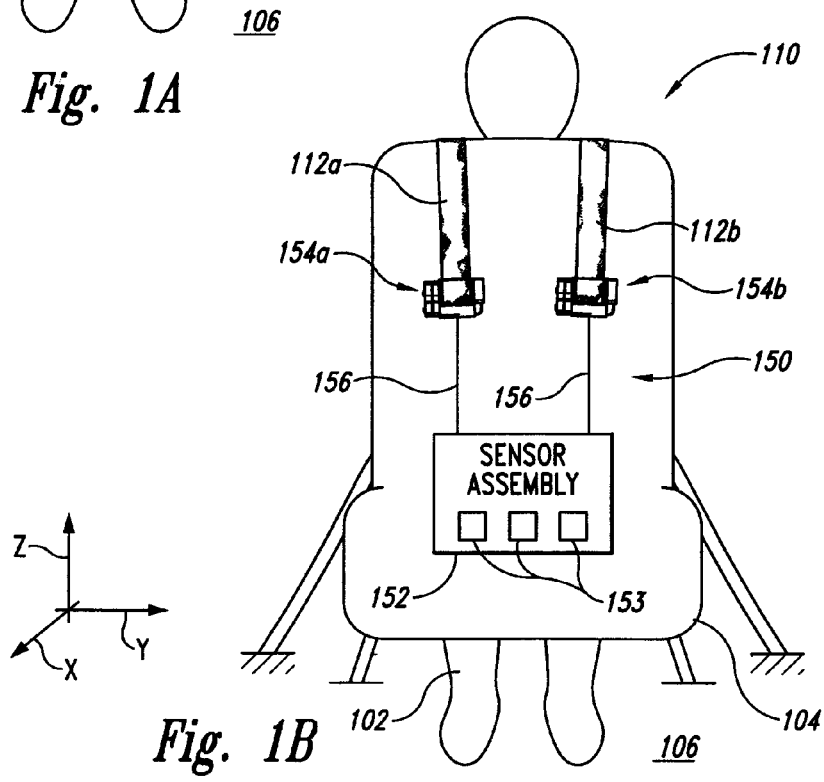

FIGS. 1A and 1B are front and back views, respectively, of an occupant restraint system 110 having a web tensioning subsystem 150 configured in accordance with an embodiment of the disclosure. Referring to FIGS. 1A and 1B together, the occupant restraint system 110 ("restraint system 110") secures an occupant 102 to a seat 104 in a vehicle 106. Suitable vehicles 106 can include ground vehicles, automobiles, military vehicles, aircraft, rotorcraft, watercraft, spacecraft, and other suitable land, sea, and air vehicles). As described in greater detail below, the web tensioning subsystem 150 is configured to control operation of certain aspects of the restraint system 110 to automatically adjust or modulate the tension of the restraint system in response to predetermined dynamic events and/or forces (e.g., rollovers, rough terrain, rapid decelerations and/or accelerations, collisions, impacts, etc.).

In the illustrated embodiment, the restraint system 110 includes a plurality of webs or belts extending around the occupant 102 and operably coupled to the vehicle 106 and/or the web tensioning subsystem 150. As used herein, "webs" can include any type of flexible straps or belts, such as seat belts made from woven material as is known in the art for use with personal restraint systems. In the illustrated embodiment, for example, the restraint system 110 is a five-point restraint system including shoulder webs 112 (identified individually as a first shoulder web 112a and a second shoulder web 112b), lap webs 114 (identified individually as a first lap web 114a and a second lap web 116b), and a crotch web 116 operably coupled to a buckle assembly 117. In other embodiments, however, the restraint system 110 can have other configurations. For example, the restraint system 110 can include a three-point or four-point restraint system. In still other embodiments, a single lap web 114 and/or a single shoulder web 118 may be used. Accordingly, the present disclosure is not limited to the particular web configurations disclosed herein.

As best seen in FIG. 1B, the web tensioning subsystem 150 includes a sensor assembly 152 (shown schematically) and one or more web retractors 154 (two are shown as a first web retractor 154a and a second web retractor 154b). A proximal end portion of the first shoulder web 112a is operably coupled to the first web retractor 154a, and a proximal end portion of the second shoulder web 112b is operably coupled to the second web retractor 154b. The first and second web retractors 154a and 154b are fixedly attached to a rear portion of the seat 104. The first and second web retractors 154a and 154b are each electrically coupled to the sensor assembly 152 with an electrical link 156 (e.g., a wire, electrical line, connector, etc.).

In the illustrated embodiment, the first and second web retractors 154a and 154b are positioned behind the seat 104. In other embodiments, however, web retractors 154 can be positioned at different locations in the vehicle 106, such as to the side of the seat 104, above the seat 104, etc. Moreover, although only two web retractors 154 are shown in the illustrated embodiment, a different number of web retractors 154 can be operably coupled to the shoulder webs 112 and/or the lap webs 114. For example, a third web retractor 154 can be operably coupled to the lap webs 114 in addition to the illustrated web retractors 154a and 154b operably coupled to the shoulder webs 112.

The sensor assembly 152 can include one or more acceleration sensors 153 (e.g., accelerometers) configured to sense vehicle accelerations (and decelerations) in one or more directions and send associated control signals to the web retractors 154. For example, the sensor assembly 152 can include at least one acceleration sensor configured to sense vehicle accelerations in the vertical direction along the Z axis and one or more additional sensors configured to sense accelerations in the fore and aft directions along the X axis and/or laterally along the Y axis. In other embodiments, the web tensioning subsystem 150 can have a different arrangement and/or include different features. For example, the web tensioning subsystem 150 can include one or more additional web retractors 154 coupled to other webs. In addition, the web retractors 154 and/or sensor assembly 160 can be positioned at other locations on the seat 104 or vehicle 106. Moreover, the sensor assembly 152 can include different features and/or have a different number of acceleration sensors.

Referring back to FIGS. 1A and 1B together, the shoulder webs 112 and other webs (e.g., lap webs 114, crotch web 116, etc.) can include features typically associated with conventional webs and safety belts. For example, the shoulder webs 112 and lap webs 114 can each include flexible segments of a fixed length and/or adjustable length to accommodate different sized occupants. In the illustrated embodiment, the lap webs 114 and crotch web 116 are fixedly secured to the seat 104 (e.g., to a seat frame and/or directed to the vehicle 106), and the shoulder webs 112 are operably coupled to the web tensioning subsystem 150. In other embodiments, however, the lap webs 114 and/or crotch web 116 can also be attached to the web tensioning subsystem 150 or another retractor (e.g., inertial reel) to automatically adjust the fit of the webs in response to movement of the occupant 102. In still other embodiments, lap webs 114 and/or other webs may be manually adjusted, static, etc.

Figure 2A:
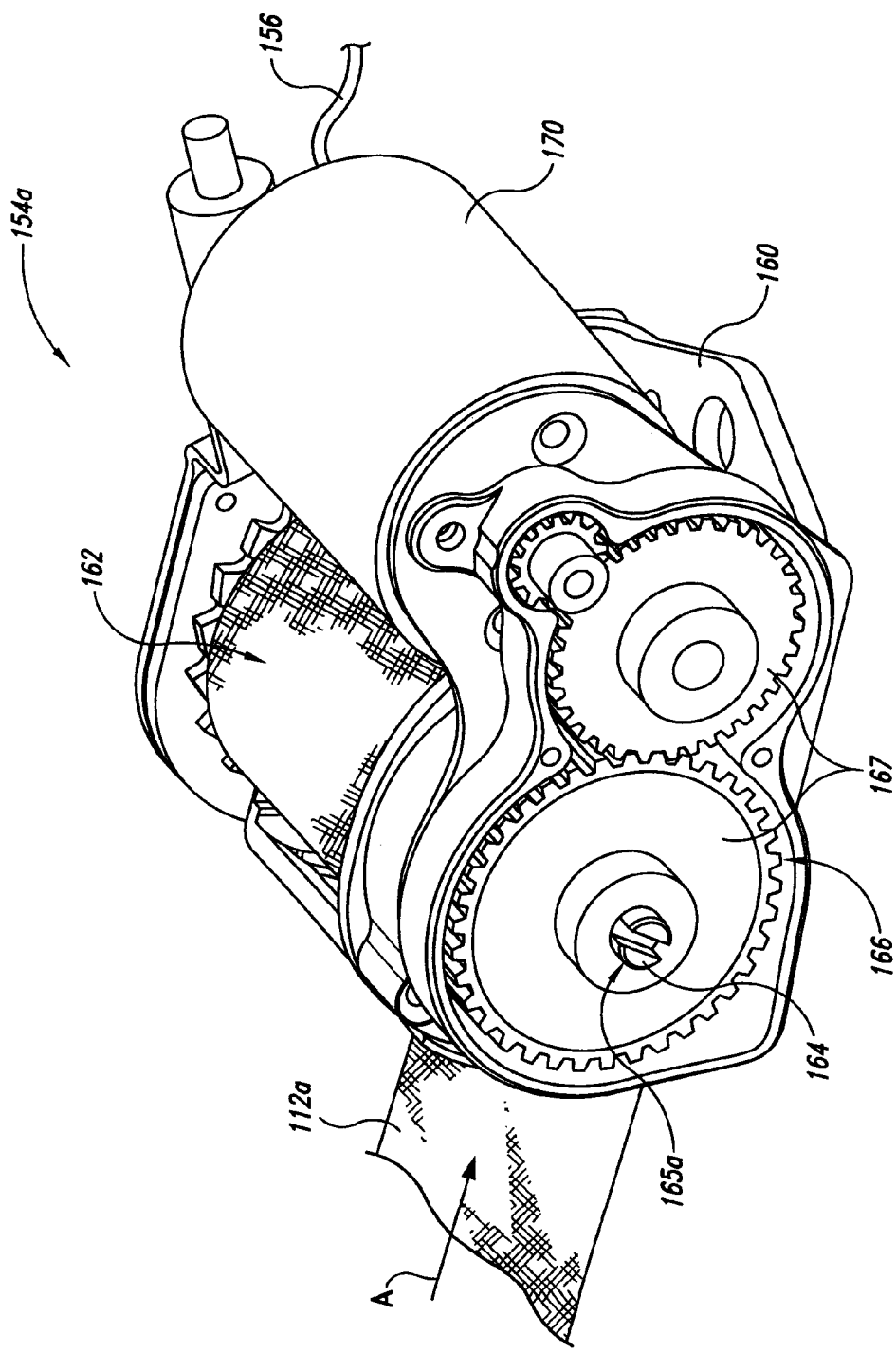
FIGS. 2A-2D are isometric views of a web retractor having an electrically activated web tensioning device configured in accordance with an embodiment of the disclosure.
Figure 2B:
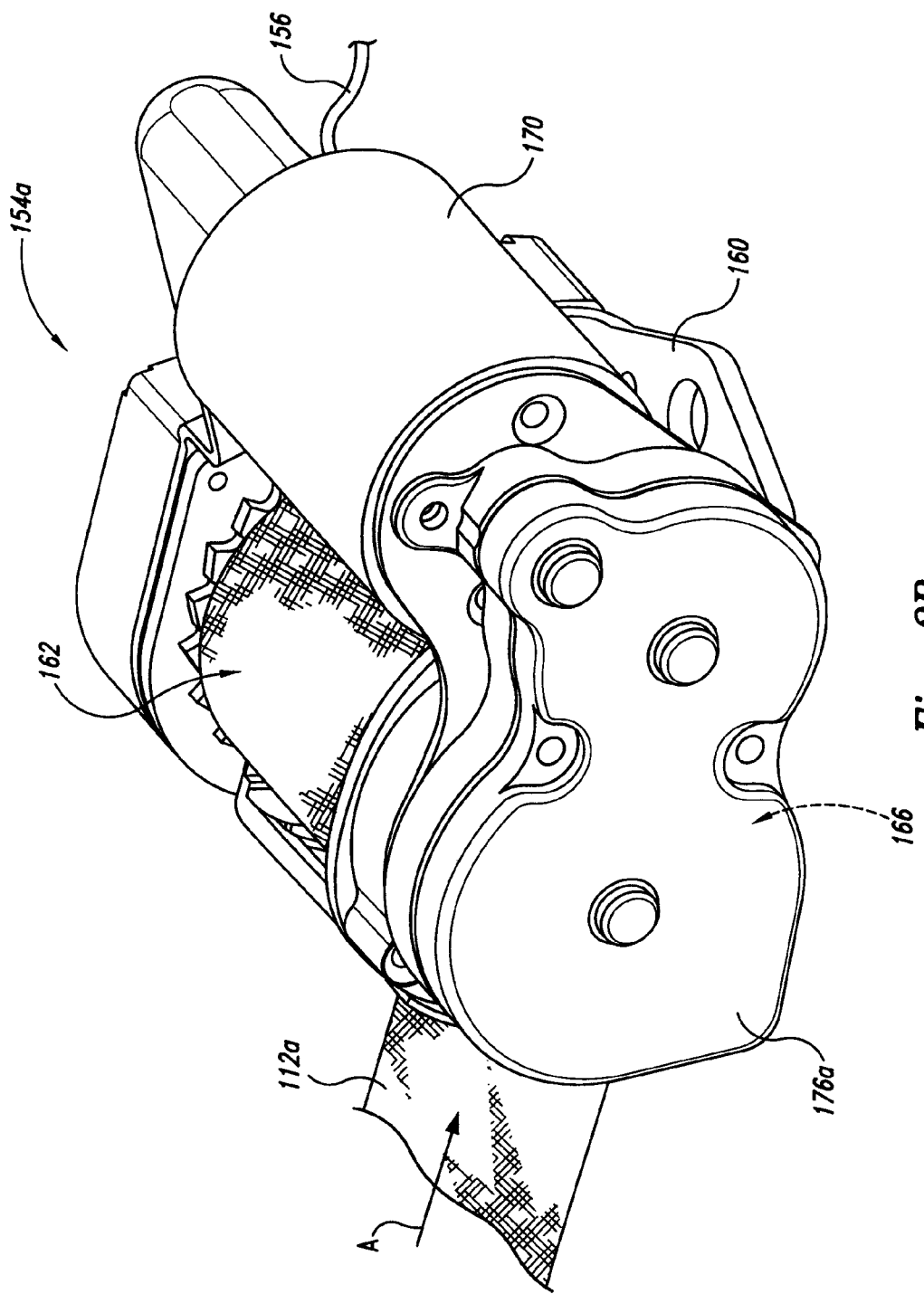
Figure 2C:
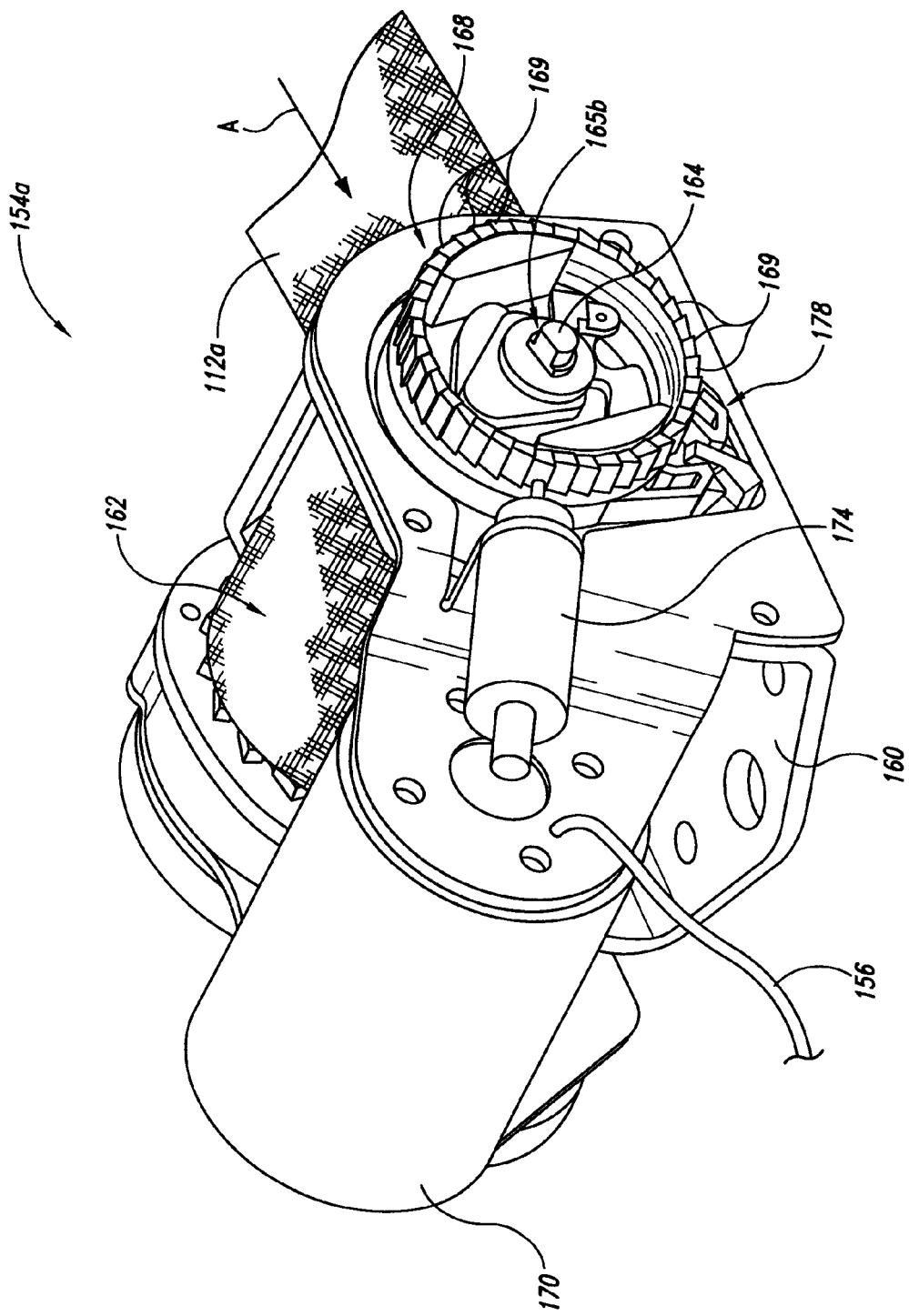
Figure 2D:
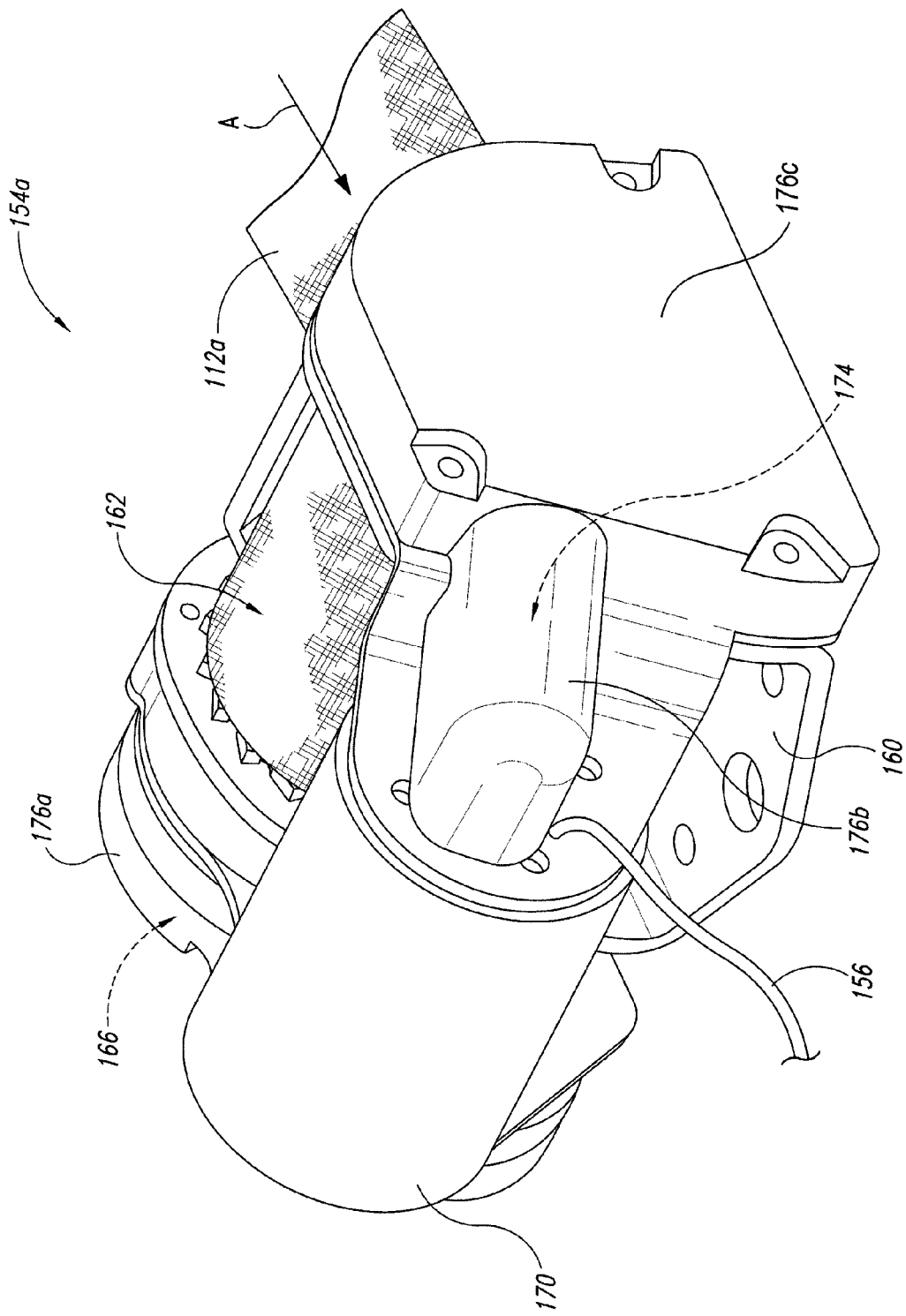

FIGS. 2A-2D are isometric views of the first web retractor 154a before installation with the vehicle 106. More specifically, FIGS. 2A and 2C are partially transparent left and right isometric views, respectively, of the first web retractor 154a, and FIGS. 2B and 2D are non-transparent left and right isometric views, respectively. Although only the first web retractor 154a is shown in FIGS. 2A-2D, the first and second web retractors 154a and 154b can be at least generally similar in structure and function.

Referring to FIGS. 2A-2D together, the first web retractor 154a includes a base or mounting bracket 160 that is fixedly attached to the vehicle 106 (e.g., a frame of the seat 104 of FIGS. 1A and 1B, a vehicle frame, a vehicle mount, etc.) and provides a secure base for the components of the web retractor. A spool 162 is carried by and rotatably mounted to the base 160. The spool 162 is configured to receive a web or belt (e.g., the first shoulder web 112a) and wind and unwind the webbing during normal operation, as well as lock the webbing in place in the event of a sudden dynamic event to prevent the webbing from being released from the spool. The first web retractor 154a can also include an actuator 170 (e.g., a DC electric motor, linear motor, rotary motor, etc.) to control operation of the spool 162. In other embodiments, the actuator 170 can include other suitable electrical, mechanical, pneumatic, hydraulic, and/or electromechanical devices in addition to, or in lieu of, the DC motor in the illustrated embodiment.

The spool 162 is fixedly attached to a rotating shaft 164 having (a) a first end 165a operably coupled to a gear assembly 166 (FIG. 2A), and (b) a second end 165b operably coupled to a locking wheel 168 (FIG. 2C). The gear assembly 166 can include, for example, one or more gears 167 positioned to provide a gear reduction for increased torque between the actuator 170 and the shaft 164. The locking wheel 168 includes a plurality of teeth 169 spaced about a perimeter thereof. The first web retractor 154a can also include a solenoid 174 configured to lock/unlock the spool 162 in response to electrical signals from the sensor assembly 152. As best seen in FIGS. 2B and 2D, the gear assembly 166 can be positioned within a first housing 176a, the solenoid 174 can be positioned within a second housing 176b, and the locking wheel 168 can be positioned within a third housing 176c.

In operation, the first web retractor 154a is configured to adapt or modulate the tension of the restraint system 110 (FIGS. 1A and 1B) in response to a detected predetermined event by activating the spool 162 and winding up, locking, or paying out the webbing (e.g., the first shoulder web 112a). More specifically, the sensor(s) 153 of the sensor assembly 152 (FIG. 1B) can sense a vehicle acceleration above a preset magnitude (e.g., during a rollover, impact, collision, rapid deceleration or acceleration, etc.). The sensor assembly 152 sends a corresponding electrical signal to the first web retractor 154a via the link 156. The actuator 170 responds to the signal by rotating the spool 162 and retracting the first shoulder web 112a in the direction of arrow A to tension the shoulder web. In some instances, the electrical signal can also energize the solenoid 174 and cause the teeth 169 of the locking wheel 168 to engage an engagement structure 178 (as best seen in FIG. 2C) and prevent the spool 162 from rotating. This can prevent the spool 162 from paying out any webbing during the event. After the predetermined event, the actuator 170 can rotate the spool 162 in the other direction and extend the first shoulder web 112a in a direction opposite to the arrow A to reduce and/or restore the pre-event tension of the first shoulder web 112a. In this manner, the first web retractor 154a (as well as the other web retractors 154) can repeatedly increase and decrease the tension of the shoulder webs 112 in response to different predetermined events and/or conditions.

Figure 3:
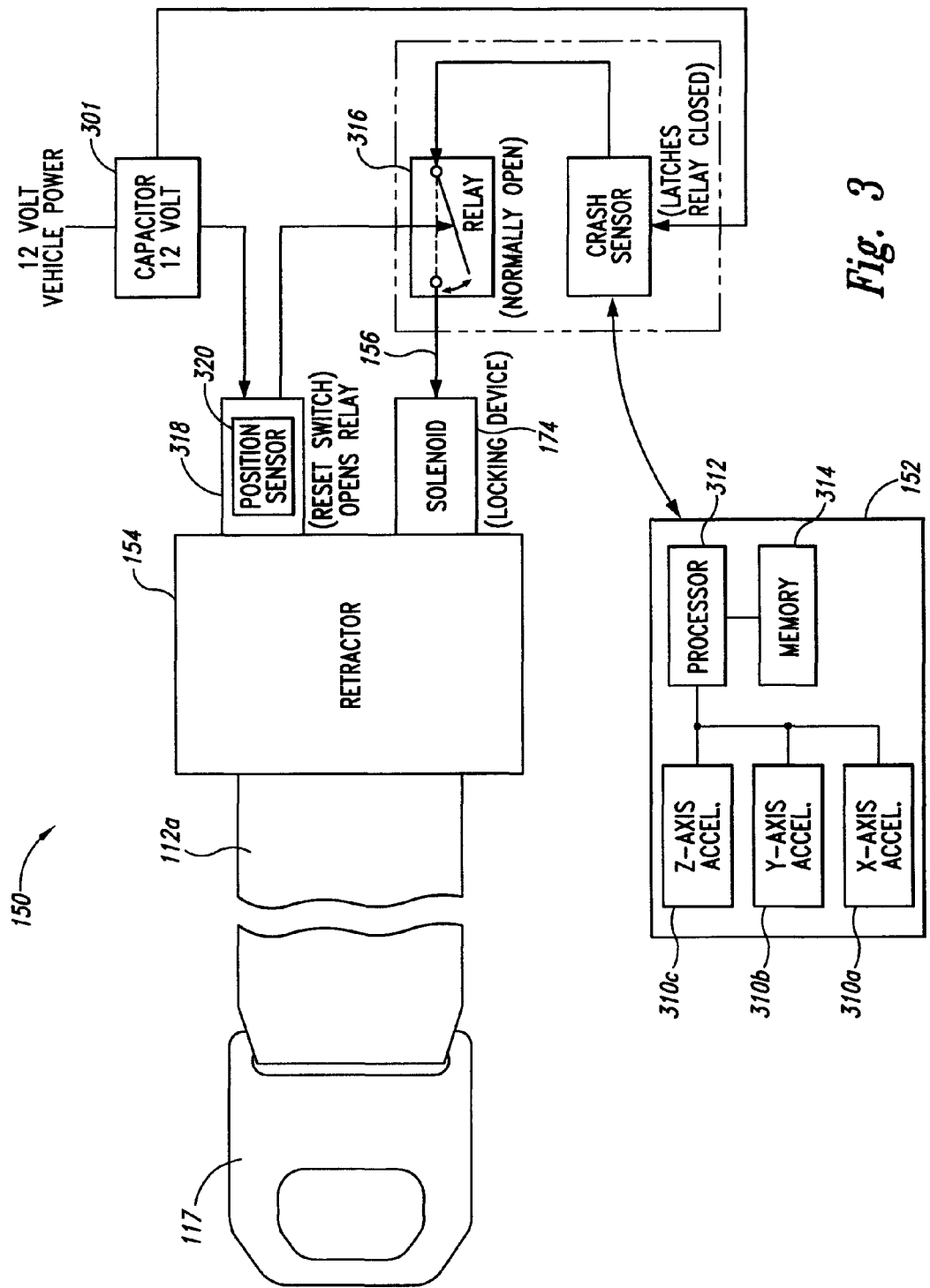
FIG. 3 is a schematic diagram of the web tensioning subsystem of FIGS. 1A and 1B configured in accordance with an embodiment of the disclosure.

FIG. 3 is a schematic diagram of a portion of the web tensioning subsystem 150 described above with reference to FIGS. 1A-2D. During vehicle operation, a vehicle power circuit 301 provides power (e.g., 12-volt and/or 24-volt vehicle power) to the sensor assembly 152. In the illustrated embodiment, the sensor assembly 152 can include an X-axis sensor 310a for sensing vehicle accelerations in the fore/aft or X direction, a Y-axis sensor 310b for sensing vehicle accelerations in the left/right or Y direction, and a Z-axis sensor 310c for sensing vehicle accelerations in the vertical or Z direction. The sensors 310a-c are operably coupled to a processor 312 and memory 314, and configured to send corresponding acceleration information to the processor 312. In operation, the processor 312 can process the information in accordance with computer-readable instructions stored on the memory 314. More specifically, the processor 312 can determine if the acceleration(s) exceed a preset magnitude and, if so, the processor 312 can send a corresponding signal to the web retractor 154 via an activation circuit 316. The components of the subsystem 150 can be operably coupled to each other with wired, wireless, fiber optic, and/or other links to control operation of the subsystem 150.

During normal vehicle operation, the activation circuit 316 disables the sensor assembly 152 and the web retractor 154. When the vehicle experiences an acceleration of above a predetermined magnitude in the X, Y, and/or Z direction (e.g., during a rollover), the sensor assembly 152 activates the activation circuit 316 and transmits an electrical signal to the web retractor 154 via the link 156. As described above, the electrical signal causes the web retractor 154 to at least temporarily lock the spool 162 (FIG. 2A) and prevent further extension of the web 112a. After the duration of the event, or if the forces associated with the predetermined event decreases, the sensor assembly 152 can notify the web retractor 154 to adjust (e.g., increase or decrease), and/or restore the tension to the attached web 112a. In the illustrated embodiment, for example, the web retractor 154 remains locked for a preset time or until a reset switch 318 deactivates the activation circuit 316, de-energizing the web retractor 154. The reset switch 318 can include a position sensor 320 operably coupled to the web retractor 154.

In other embodiments, the web tensioning subsystem 150 can include different features and/or have a different configuration. For example, although the web tensioning subsystem 150 illustrated in FIG. 3 shows the components of the device operably coupled to each other, one skilled in the art will appreciate that a number of the components of the subsystem 150 may be combined or included in a single component.

Figure 4A:
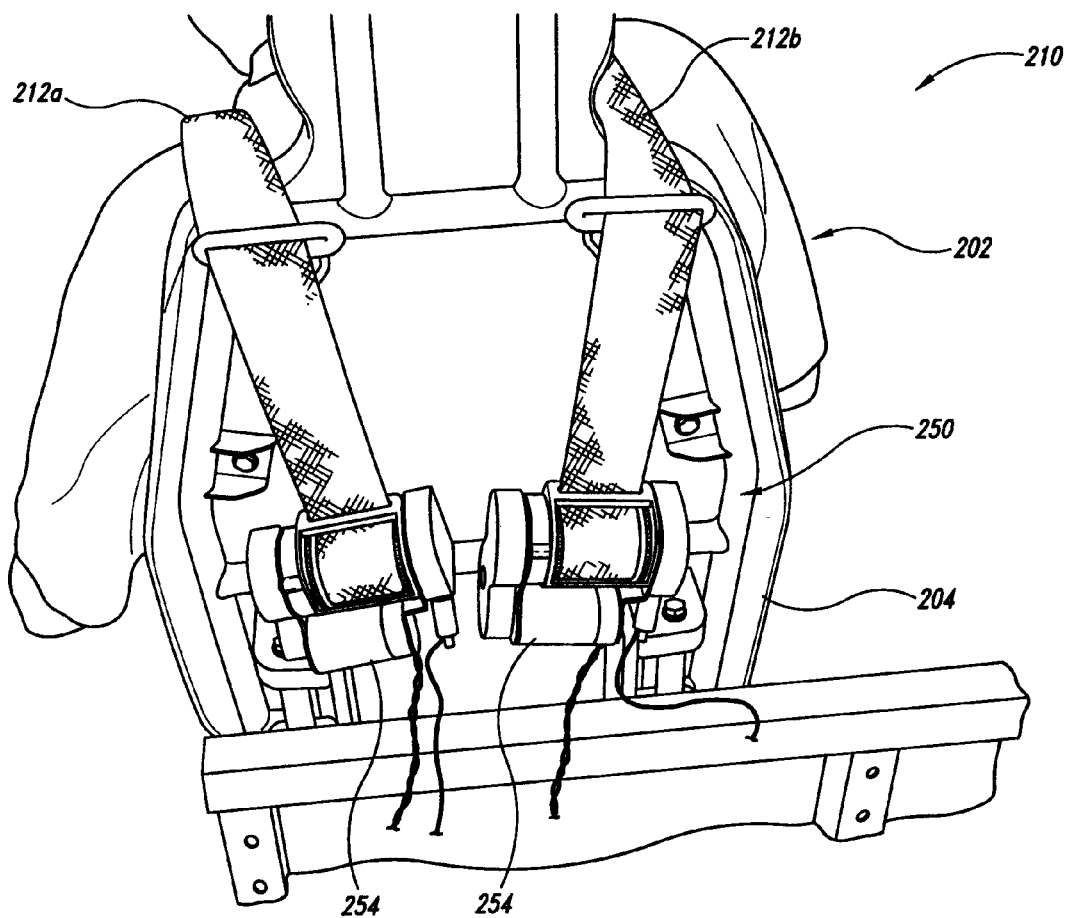
FIGS. 4A-4C illustrate a portion of an occupant restraint system including a web tensioning subsystem configured in accordance with another embodiment of the disclosure.
Figure 4B:
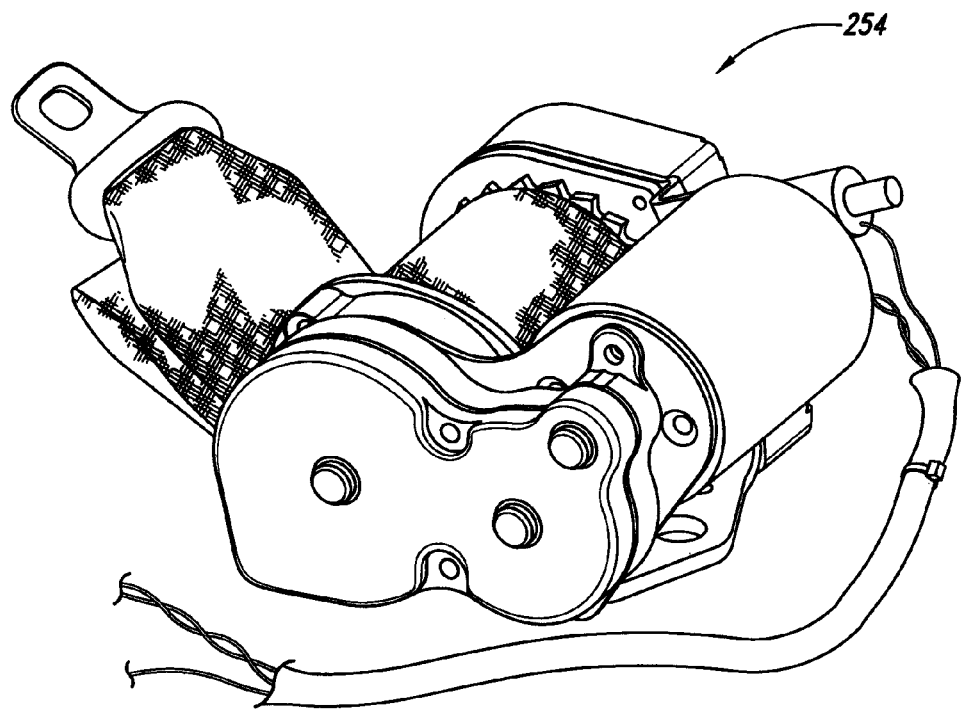
Figure 4C:
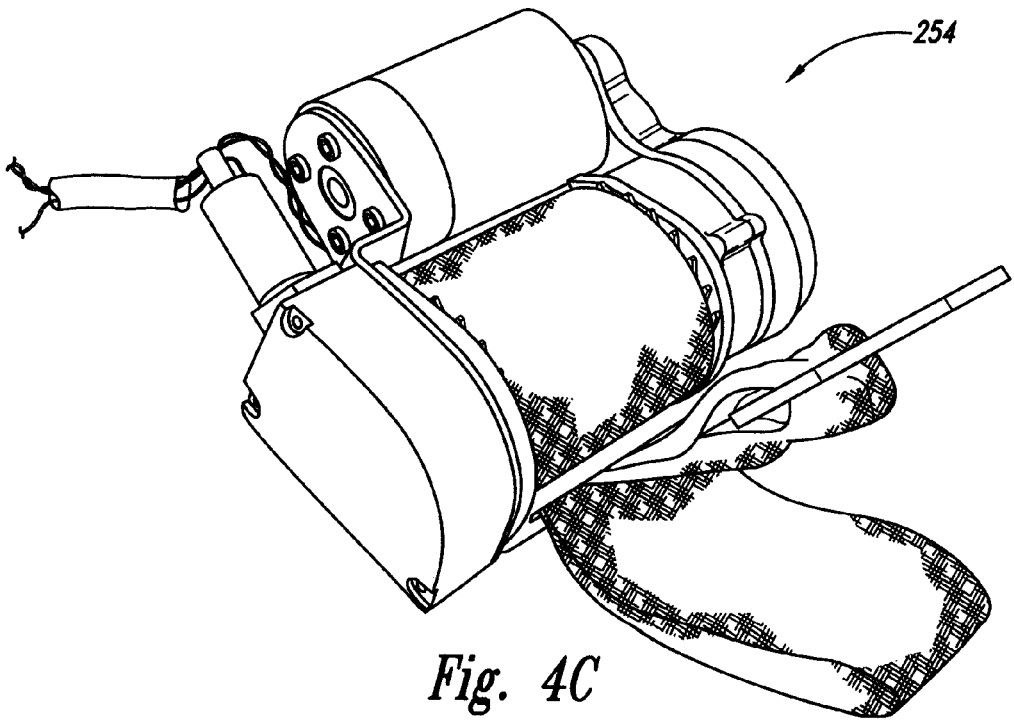

FIGS. 4A-4C illustrate a portion of an occupant restraint system 210 including a web tensioning subsystem 250 configured in accordance with another embodiment of the disclosure. More specifically, FIG. 4A is a back view of the occupant restraint system 210 and web tensioning subsystem 250. The restraint system 210 also includes a plurality of webs or belts (only two shoulder webs 212a and 212b are shown) extending around the occupant 202 to releasably secure the occupant 202 to a seat 204 in a vehicle 206. In the illustrated embodiment, for example, restraint system 210 is a five-point restraint system generally similar to the restraint system 110 described above with reference to FIGS. 1A and 1B). The web tensioning subsystem 250 can include, for example, two web retractors 254 having electrically activated web tensioning devices and a sensor assembly (not shown). In the illustrated embodiment, the web retractors 254 are fixedly attached to a frame of the seat 204.

FIGS. 4B and 4C are left and right isometric views, respectively, of one of the web retractors 254 before installation with the seat 204. The web retractors 254 can be generally similar to the web retractors 154 described above with reference to FIGS. 1A-2D, and can function in generally the same way.

The web tensioning subsystems 150 and 250 described above can be configured to provide different amounts of tension to the corresponding webs (e.g., the shoulder webs 112) based on different corresponding predetermined events. For example, the web retractors 154a-b can partially and/or fully retract the shoulder webs 112 to provide different amounts of tension. By way of illustration, when the web tensioning subsystem 150 is employed in an automobile, the web tensioning subsystem 150 can tension the shoulder webs 112 with a first force in response to driving the automobile on rough or uneven terrain. After the rough terrain, the web tensioning subsystem 150 can restore the shoulder webs 112 to their original tensions. If the automobile rolls over or is in an accident, however, the web tensioning subsystem 150 can provide a second force greater than the first force, to restrain the occupant 102 in the seat 104. Moreover, instead of providing discrete amounts of tension, in other embodiments, the web tensioning subsystem 150 can provide an amount of tension that is proportional to the severity of the predetermined event.

One advantage of the restraint systems and associated web tensioning subsystems described above and disclosed herein is that they can secure an occupant in their seat when the vehicle experiences a rapid deceleration, acceleration, impact, collision, rollover, etc. Another advantage of the tensioning apparatuses described above is that they can adjust the tension of the attached webs in response to different predetermined events, and restore the webs to their original tension after the predetermined events. A further advantage of the tensioning apparatuses described above is that they can repeatedly adjust the tension of the attached webs in response to the different predetermined events.

From the foregoing, it will be appreciated that specific embodiments have been described herein for purposes of illustration, but that various modifications may be made without deviating from the spirit and scope of the various embodiments of the disclosure. For example, the occupant restraint systems described above with reference to FIGS. 1-4C may have different configurations and/or include different features. Moreover, specific elements of any of the foregoing embodiments can be combined or substituted for elements in other embodiments. For example, the occupant restraint systems described in the context of specific vehicles (e.g., automobile or aircraft systems) can be implemented in a number of other types of vehicles (e.g., non-automobile or non-aircraft systems). Certain aspects of the disclosure are accordingly not limited to automobile or aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, the disclosure is not limited, except as by the appended claims.

I claim:

1. An occupant restraint system for use in a vehicle, the occupant restraint system comprising:
   a flexible and elongate web configured to extend across at least a portion of an occupant seated in the vehicle;
   an electrically actuated web retractor operably coupled to a proximal end portion of the web, wherein the electrically actuated web retractor includes:
      a spool configured to wind and unwind the elongate web during operation; and
      an electrical actuator operably coupled to the spool and configured to rotatably move the spool;
      a gear assembly operably coupled to the spool, wherein the gear assembly comprises one or more gears positioned to provide a pear reduction for increased torque between the electrical actuator and the spool; and
      a solenoid operably coupled to the spool; and
   an acceleration sensor operably coupled to the electrically actuated web retractor, wherein the acceleration sensor is configured to send an electrical signal to the web retractor in response to a vehicle acceleration above a preset magnitude, wherein, in response to receiving the electrical signal from the acceleration sensor, the electrical actuator is configured to retract the web, and further wherein, in response to receiving the electrical signal from the acceleration sensor, the solenoid is configured to prevent the spool from paying out the web.

2. The occupant restraint system of claim 1 wherein the electrically actuated web retractor comprises:
   a base;
   wherein the spool is rotatably mounted to the base.

3. An occupant restraint system for use in a vehicle, the occupant restraint system comprising:
   a flexible and elongate web configured to extend across at least a portion of an occupant seated in the vehicle;
   an electrically actuated web retractor operably coupled to a proximal end portion of the web, wherein the web retractor is configured to automatically wind and unwind the elongate web, and wherein the electrically actuated web retractor comprises:

a base;
a spool rotatably mounted to the base, wherein the spool is configured to wind and unwind the elongate web during operation and at least temporarily prevent the web from moving inwardly or outwardly, and wherein the spool is fixedly attached to a rotating shaft having a first end and a second end opposite the first end;
an electrical actuator operably coupled to the spool and configured to rotatably move the spool; and
a gear assembly operably coupled to the first end of the rotating shaft, wherein the gear assembly comprises one or more gears positioned to provide a gear reduction for increased torque between the electrical actuator and the shaft;
a locking wheel operably coupled to the second end of the rotating shaft, wherein the locking wheel comprises a plurality of teeth spaced about a perimeter thereof; and
a solenoid operably coupled to the spool; and
an acceleration sensor operably coupled to the electrically actuated web retractor;
wherein the acceleration sensor is configured to send an electrical signal to the web retractor in response to a vehicle acceleration above a preset magnitude, wherein, in response to receiving the electrical signal from the acceleration sensor, the web retractor is configured to (a) retract the web, and/or (b) at least temporarily prevent the web from moving inwardly or outwardly; and
wherein the solenoid is configured to lock and unlock the spool in response to signals from the acceleration sensor.

4. The occupant restraint system of claim 3 wherein the electrical actuator comprises a DC motor.

5. The occupant restraint system of claim 3 wherein:
the gear assembly is positioned in a first housing;
the solenoid is positioned in a second housing different than first housing; and
the locking wheel is positioned in a third housing different than the first and second housings.

6. The occupant restraint system of claim 3 wherein the acceleration sensor is configured to sense vehicle accelerations in a vertical direction along a Z-axis.

7. The occupant restraint system of claim 3 wherein the acceleration sensor is a first acceleration sensor, and wherein the occupant restraint system further comprises a second acceleration sensor and a third acceleration sensor, and wherein:
the first acceleration sensor is configured to sense vehicle accelerations in a vertical direction along a Z-axis;
the second acceleration sensor is configured to sense vehicle accelerations in a forward and/or aft direction along an X-axis; and
the third acceleration sensor is configured to sense vehicle accelerations in a lateral direction along a Y-axis.

8. The occupant restraint system of claim 3, further comprising a seat for use in the vehicle and configured to hold the occupant, and wherein:
the electrically actuated web retractor is fixedly attached to a frame of the seat; and
the acceleration sensor is coupled to the frame of the seat.

9. The occupant restraint system of claim 3 wherein the web retractor is further configured to extend the web and/or allow the web to move inwardly or outwardly after the forces associated with the increased vehicle acceleration have decreased and the vehicle acceleration is below the preset magnitude.

10. The occupant restraint system of claim 3 wherein the web retractor is configured to modulate tension in the web a plurality of different times without requiring external maintenance or input from an operator.

11. The occupant restraint system of claim 3 wherein the vehicle comprises an automobile.

12. An occupant restraint system for use in a vehicle, the occupant restraint system comprising:
a flexible and elongate web configured to extend across at least a portion of an occupant seated in the vehicle;
means for automatically winding and unwinding the web, wherein the means for automatically winding and unwinding the web is operably coupled to a proximal end portion of the elongate web, and wherein the means for automatically winding and unwinding the web include:
a spool configured to wind and unwind the elongate web during operation;
an electrical actuator operably coupled to the spool and configured to rotatably move the spool;
a gear assembly having one or more gears positioned to provide increased torque between the electrical actuator and the spool;
a locking wheel operably coupled to the spool; and
means for locking the locking wheel; and
means for sensing a vehicle acceleration and sending an electrical signal to the means for automatically winding and unwinding the web in response to a vehicle acceleration above a predetermined threshold value,
wherein, in response to receiving the electrical signal, the means for automatically winding and unwinding the web is configured to (a) retractably wind the web around the spool, and/or (b) at least temporarily prevent the web from moving inwardly or outwardly; and
wherein, in response to receiving the electrical signal, the means for locking the locking wheel is configured to prevent the spool from paving out web.

13. The occupant restraint system of claim 12 wherein the web, the means for automatically winding and unwinding the web, and the means for sensing the vehicle acceleration are operably coupled to and carried by a seat for use in the vehicle.

* * * * *